No. 669,983. Patented Mar. 19, 1901.
O. H. EWEST.
PIPE CUTTING TOOL.
(Application filed June 30, 1900.)
(No Model.)
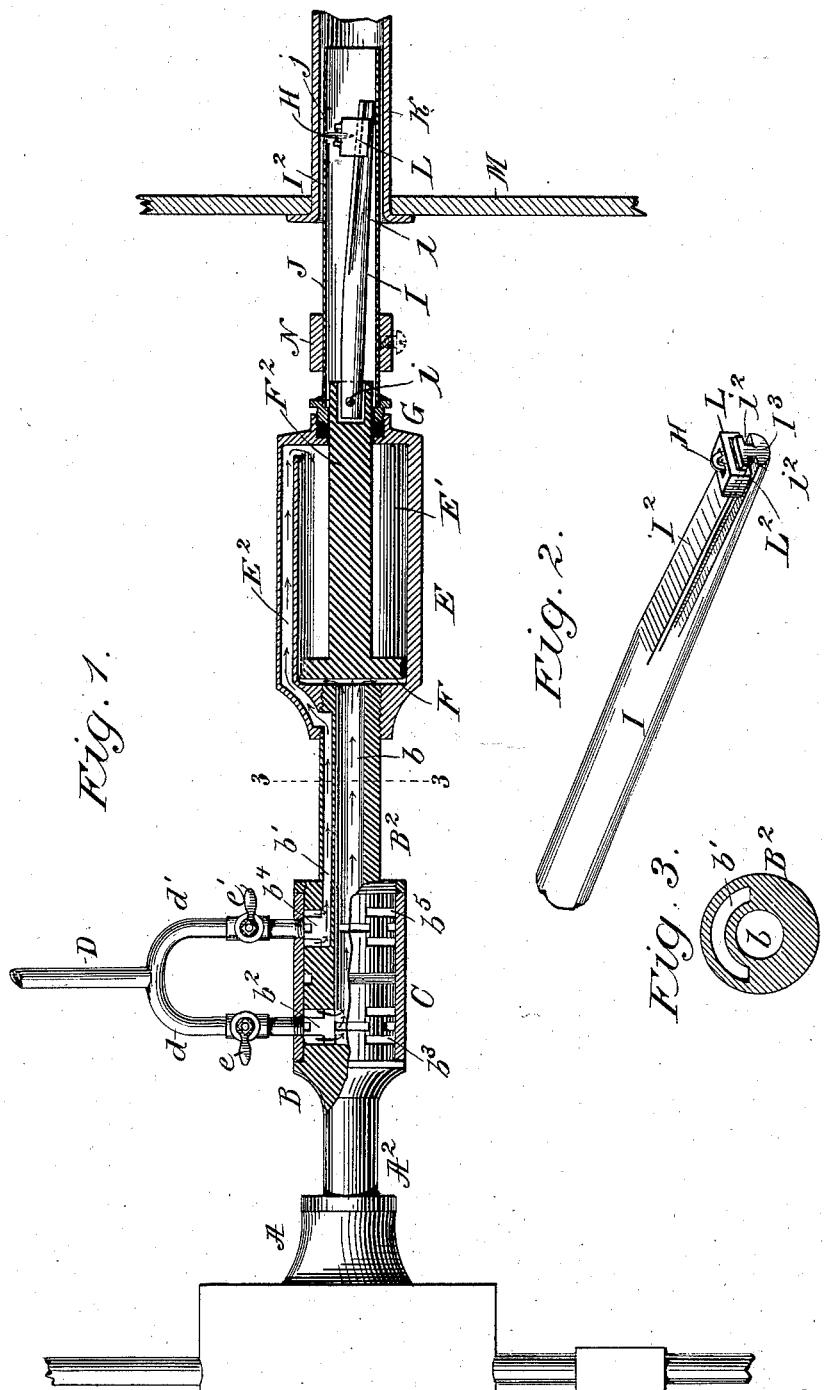

UNITED STATES PATENT OFFICE.

OTTO H. EWEST, OF JERSEY CITY, NEW JERSEY.

PIPE-CUTTING TOOL.

SPECIFICATION forming part of Letters Patent No. 669,983, dated March 19, 1901.

Application filed June 30, 1900. Serial No. 22,192. (No model.)

*To all whom it may concern:*

Be it known that I, OTTO H. EWEST, a citizen of the United States, residing in Jersey City, Hudson county, New Jersey, have invented certain new and useful Improvements in Pipe-Cutting Tools, of which the following is a specification.

My invention relates more particularly to improvements in tools or implements adapted to cut pipes, tubes, or the like from the interior; and the object of the invention is to provide such a tool or implement with means for readily advancing the tool to the work and for withdrawing the tool therefrom; and to this end the invention consists in the novel details of improvement, that will be more fully hereinafter set forth and then pointed out in the claims.

Reference is to be had to the accompanying drawings, forming part hereof, wherein—

Figure 1 is a side elevation, partly in section, of a tool or implement embodying my improvements. Fig. 2 is a detail perspective view, enlarged, of the cutter and its operating means; and Fig. 3 is a cross-section on the line 3 3 in Fig. 1.

Similar letters of reference indicate corresponding parts in the several views.

In the drawings the letter A indicates a motor of any suitable or well-known type—such, for instance, as a compressed-air motor—and B is a rotative head attached to or formed on the shaft $A^2$ of the motor. The head B is journaled within a casing or sleeve C, that is connected with an air-supply pipe D, shown provided with two outlets or branches $d\ d'$, opening through the casing C, each branch being provided with a valve $e\ e'$. The pipe D may be connected with an air or other propulsive medium supply in any suitable manner. The head B has an extension $B^2$, that is provided with ports $b\ b'$, the port $b$ leading to a space $b^2$ in head B, with which a series of openings $b^3$ in the head B communicate, the openings $b^3$ also communicating with the passage or branch $d$. The port $b'$ communicates with a space $b^4$ in head B, that is entirely independent of the space $b^2$ and communicates with openings $b^5$ in head B, which openings communicate with the branch or passage $d'$. Thus it will be seen that by turning on either valve $e$ or $e'$ air can be directed through port $b$ or $b'$, while head B continues to rotate within casing or shell C. The extension $B^2$ is connected with a cylinder that is provided with a bore $E'$, within which a piston F is adapted to slide, the stem $F^2$ of the piston projecting through one end of the cylinder, suitable packing G being provided around said stem to make a tight joint. The port $b$ of extension $B^2$ communicates with the bore $E'$ of cylinder E at one end, and said cylinder is provided with a port $E^2$, that communicates with the port $b'$ and leads to the opposite end of the cylinder, where it communicates with the bore $E'$. By this means when air is let into port $b$ it will push piston F and its stem $F^2$ toward the outer end of cylinder E, and when air is let into ports $b'\ E^2$ it will press the piston F in a reverse direction.

The stem $F^2$ of the piston is to control the feeding of a tool or cutter H, and for this purpose I have shown a rod I attached to the end of stem $F^2$, as by a pivot $i$ or any other suitable means, and J is a tube connected with the cylinder E or its coupling G, so as to rotate therewith, and said tube is adapted to be passed into a tube K to be cut. Thus the stem $F^2$ and rod I are adapted to travel back and forth in tube J, and said tube has an opening or slot $j$, through which the cutter H is adapted to project. The sliding of rod I is to move the cutter H toward and from the tube K, and for this purpose I have shown the rod I provided with a beveled or inclined side $I^2$, adapted to coact with a suitable toolholder L, to which the tool or cutter H is connected. In the example illustrated the rod I is provided with inclined grooves $i^2$ on opposite sides, forming a substantially T-shaped rib $I^3$, that inclines outwardly and is adapted to receive the correspondingly-shaped opening $L^2$ of tool-holder L, whereby the latter is held upon rod I, so that as the rod I reciprocates the tool or cutter H will be moved transversely thereof. The tool or cutter H that I have shown is circular and pivotally carried by holder L, and as the cutter and holder L are alined with opening $j$ the cutter is free to be moved transversely of the tube J through said opening to and from the work or tube K. The tube K is intended to represent a tube of a boiler, M being an end plate or head of the latter. Upon tube J is a stop N, which may be held thereon adjustably, if desired, in any suitable manner, so as to limit the distance that tube J and the cutter H are to be pushed into the tube K.

The operation of the tool or implement is as follows: The piston F being adjusted in the position shown in Fig. 1, so that the tool H is drawn inwardly, the casing C is grasped and tube J inserted as far as desired in the tube K to be cut, and valve e is opened, whereby air from pipe D passes into port b against piston F, while at the same time all the parts excepting the casing C are rotated by the motor, thus carrying the cutter H around within tube K. The air-pressure on piston F forces rod I outwardly, thereby pressing tool H to the work, and during its rotation said tool cuts into the tube K from within, so as to sever the same behind the wall M, the air-pressure upon piston F keeping the tool to the work by causing rod I to slide under the tool. After tube K is cut through valve e is closed and valve e' is opened, whereby air passes through ports b' and E² into the outer end of cylinder E and presses against the piston F, thereby moving the latter back within cylinder E and withdrawing rod I, whose inclined portion withdraws the tool H from the work, so that the implement can be withdrawn from tube K. The parts of the severed tube can then be removed by suitable means. It will thus be seen that the feeding of the tool to and from the work is readily controlled through the medium of the valves e e', and that the tool will thus be enabled to be withdrawn from the severed tube without interference from the same.

Having now described my invention, what I claim is—

1. The combination of a cylinder and a piston, and means for rotating the cylinder, with means for supplying the cylinder with a propulsive medium on opposite sides of the piston, a tool or cutter, and means for causing the piston to move the same toward and from the work, substantially as described.

2. The combination of a cylinder and a piston, and means for rotating the cylinder, with means for supplying the cylinder with a propulsive medium on opposite sides of the piston, a tube connected with the cylinder to be rotated by it, a tool or cutter within the tube adapted to pass through an opening in the side of the same, and means connecting the tool or cutter with the piston for feeding the same to and from the work by the piston, substantially as described.

3. The combination of a cylinder and a piston, with means for supplying a propulsive medium on opposite sides of the piston, a tube connected with the cylinder to be rotated by it, a tool or cutter within the tube, a sliding rod connected with the piston and located within said tube, and means for causing the rod to move the tool toward and from the work as the rod is operated by the piston, substantially as described.

4. The combination of a rotative head, a casing or shell within which it is journaled, means for rotating the head, a cylinder connected with said head to be rotated by it, ports connecting spaces in said head with opposite ends of the cylinder, and means for controlling the supply of propulsive medium to said ports, with a piston in said cylinder, a tool or cutter, and means for causing said piston to move the tool or cutter toward and from the work, substantially as described.

5. The combination of a rotative head, means for operating the same, a casing or shell in which said head is journaled, said head having an extension provided with ports leading to separate spaces in said head, means for supplying said spaces with a propulsive medium and a cylinder connected with said extension, one of said ports leading to one end of the cylinder and the other port communicating with a port in the cylinder that leads to the opposite end of the same, with a piston in said cylinder, a stem extending from said piston, a tube connected with said cylinder, a tool or cutter adapted to pass through a side opening in said tube, a rod connected with said stem, a tool-holder connected with said rod and with said tool or cutter, and means for causing said rod to move said tool or cutter toward and from the work, substantially as described.

OTTO H. EWEST.

Witnesses:
T. F. BOURNE,
FRANZE EWEST.